(12) United States Patent
Hayes et al.

(10) Patent No.: US 6,509,439 B1
(45) Date of Patent: *Jan. 21, 2003

(54) PROCESS FOR THE PRODUCTION OF POLYAMIDES FROM DINITRILES AND DIAMINES

(75) Inventors: Richard Allen Hayes, Brentwood, TN (US); David N Marks, Newark, DE (US); Maria Van Eijndhoven, Wilmington, DE (US); Hari Babu Sunkara, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/549,330

(22) Filed: Apr. 14, 2000

(51) Int. Cl.⁷ .......................... C08G 69/00; C08G 69/28
(52) U.S. Cl. .......................... 528/310; 528/312; 528/324; 528/329.1; 528/332; 528/335; 528/336
(58) Field of Search .......................... 528/310, 312, 528/324, 329.1, 332, 335, 336

(56) References Cited

U.S. PATENT DOCUMENTS

| | | | |
|---|---|---|---|
| 2,245,129 A | 6/1941 | Greenewalt | 528/310 |
| 3,847,876 A | 11/1974 | Onsager | 528/323 |
| 4,436,898 A | 3/1984 | Hofmann et al. | 528/336 |
| 4,490,521 A | 12/1984 | Coffey et al. | 528/336 |
| 4,501,881 A | 2/1985 | Greene et al. | 528/336 |
| 4,520,190 A | 5/1985 | Coffey et al. | 528/336 |
| 4,528,362 A | 7/1985 | Hofmann et al. | 528/336 |
| 4,542,205 A | 9/1985 | Curatolo et al. | 528/336 |
| 4,543,407 A | 9/1985 | Curatolo et al. | 528/336 |
| 4,603,192 A | 7/1986 | Coffey et al. | 528/336 |
| 4,640,976 A | 2/1987 | Curatolo et al. | 528/336 |
| 4,689,394 A | 8/1987 | Curatolo et al. | 528/336 |
| 4,719,285 A | 1/1988 | Curatolo et al. | 528/336 |
| 4,725,666 A | 2/1988 | Curatolo et al. | 528/336 |
| 4,732,965 A | 3/1988 | Curatolo et al. | 528/336 |
| 4,734,487 A | 3/1988 | Curatolo et al. | 528/336 |
| 4,739,035 A | 4/1988 | Shyu et al. | 528/335 |
| 4,749,776 A | 6/1988 | Sentman et al. | 528/336 |
| 4,801,798 A | 1/1989 | Murahashi et al. | 564/126 |
| 4,942,220 A | 7/1990 | Murahashi et al. | 528/336 |
| 5,596,070 A | 1/1997 | Gotz | 528/310 |
| 5,627,257 A | 5/1997 | Liehr | 528/335 |
| 6,069,228 A * | 5/2000 | Alsop et al. | 528/310 |
| 6,084,056 A * | 7/2000 | Hayes et al. | 528/335 |
| 6,103,863 A * | 8/2000 | Hayes et al. | 528/332 |

FOREIGN PATENT DOCUMENTS

EP     0 065 291 A     11/1982

* cited by examiner

*Primary Examiner*—P. Hampton-Hightower

(57) ABSTRACT

A process for producing polyamides from dinitriles and diamines in a continuous reaction using subsequent heating steps. In particular, the process involves contacting a dinitrile, a diamine, water, and optionally a catalyst to form a reaction mixture; heating the reaction mixture to a first elevated temperature of between about 180 to about 240° C., maintaining said temperature for about 0.10 to about 20 hours, and optionally controlling the pressure in this heating step by venting; heating the reaction mixture to a second elevated temperature of between about 250 to about 350° C., adding water to the reaction mixture before or after the second elevated temperature is reached, maintaining the pressure in the second heating step above atmospheric pressure by venting at least some of the water, and maintaining the second elevated temperature for a period of about 0.10 to about 10 hours; and recovering the polyamide.

16 Claims, No Drawings

PROCESS FOR THE PRODUCTION OF POLYAMIDES FROM DINITRILES AND DIAMINES

BACKGROUND OF THE INVENTION

1. Field of the Invention

This invention relates to a process for producing polyamides from dinitriles and diamines and to related polyamide products produced from the process.

2. Description of Related Art

Currently, polyamides are being produced commercially from dicarboxylic acids and diamines. For example, Nylon 6,6 is commercially produced from adipic acid and hexamethylenediamine. Alternate routes to these materials have been explored within the art. For example, the art has taught processes to produce Nylon 6,6 from adiponitrile and hexamethylenediamine. Greenewalt, U.S. Pat. No. 2,245,129, discloses a process to produce polyamides by reacting adiponitrile, hexamethylenediamine, and water at a high temperature and pressure. However, the Greenewalt patent requires a two-stage process in which, after initial heating, the process must be discontinued to allow the reaction to cool, and then be subsequently heated again prior to recovering the polyamide. A modified process to react adiponitrile with hexamethylenediamine and water was disclosed by Onsager in U.S. Pat. No. 3,847,876, but at extremely high pressures of up to about 2000 psig.

The production of polyamides was improved by the introduction of catalysts to promote or enhance the production of polyamides. Several catalytic methods are disclosed, for example, in U.S. Pat. Nos. 4,490,521, 4,542,205, 4,603,192, 4,725,666, 4,749,776, 4,436,898, and 4,528,362. In addition, cocatalysts were introduced to further promote and enhance the production of polyamide. For example, a process of forming polyamides from adiponitrile, hexamethylenediamine, adipic acid, and water was described in Greene et al., U.S. Pat. No. 4,501,881.

Each of the methods described above, however, have the significant shortcoming of producing polyamides from adiponitrile and hexamethylenediamine concurrently with the production of significant levels of the dimer of the aliphatic diamine. In the case of hexamethylenediamine, the dimer produced would be bishexamethylenetriamine (BHMT). The diamine dimerization is promoted by the high temperatures and pressures required by the processes described above. (See Shyu, U.S. Pat. No. 4,739,035, and Liehr et al., U.S. Pat. No. 5,627,257). These diamine dimers or triamine by-products serve as crosslinkers for the linear polyamide chain, which can lead to a significant product quality deterioration.

The problems associated with the production of triamine by-products was partially overcome by the processes disclosed by Shyu et al., U.S. Pat. No. 4,739,035, and Liehr et al., U.S. Pat. No. 5,627,257. Shyu et al. teach a two-step process, wherein the first step includes the hydrolysis of adiponitrile with water, catalysts, and from 0 to 10 weight percent of the total hexamethylene diamine needed for the reaction. The second step includes adding the remainder of the hexamethylenediamine followed by polymerization. This two-step process provided triamine levels in the 560 to 1300 ppm levels as compared to the 1420 to 1610 ppm levels found through the teachings of other background art.

Liehr et al. describe a two-step process. The first step includes the nearly full hydrolysis of the adiponitrile to adipic acid utilizing a catalyst and a cocatalyst. The cocatalyst was described as a saturated aliphatic or aromatic dicarboxylic acid. The second step includes the addition of at least an equimolar amount of diamine followed by polymerization. Through use of this process, they were able to achieve triamine levels between 500 and 600 ppm. However, this process is hindered by the substantial amounts of cocatalyst required. For example, the Liehr process requires a level of the dicarboxylic acid cocatalyst from about 1 to 13 weight percent based on the adiponitrile level. In one example, they teach the use of 73 grams adipic acid cocatalyst in the hydrolysis of 487 grams of adiponitrile.

Each of the two-step processes described by Shyu et al. and Liehr et al. are also hindered by the inherent difficulty with discontinuous processes and significantly greater process length (time) when compared to continuous processes of the background art. The present invention overcomes the shortcomings of the background art providing a simplified continuous production process for polyamides with low levels of triamine impurities without the need for substantial amounts of cocatalysts.

SUMMARY OF THE INVENTION

The present invention is directed to a process for producing a polyamide comprising:

reacting a dinitrile with a diamine, water, and optionally a catalyst to form a reaction mixture;

heating the reaction mixture to a first elevated temperature of between about 180 to about 240° C., preferably, about 200 to about 220° C.; maintaining said temperature for 0.10 to 20 hours, preferably 0.10 to 10 hours; and optionally controlling the pressure in this heating step by venting;

then, after maintaining the first elevated temperature, subsequently heating the reaction mixture to a second elevated temperature of between about 250 to about 350° C., preferably, about 270 to about 300° C.; adding water to the reaction mixture before or after the second elevated temperature is reached; maintaining the pressure in the second heating step above atmospheric pressure by venting at least some of the water; and maintaining the second elevated temperature for a period of about 0.10 to about 10 hours, preferably 0.10 to 4 hours; and recovering the polyamide.

In another embodiment of the invention, in the reacting step, the diamine is added in an amount within 10 mole percent of equimolar based on the dinitrile and at least a stoichiometric amount of water is added relative to the dinitrile.

In another embodiment of the invention, the step of heating the reaction mixture to a second elevated temperature is obtained under a reaction pressure of above atmospheric pressure. After maintaining the second elevated temperature, the reaction mixture is then optionally maintained at a third temperature of about 250 to about 350° C. while the reaction pressure is reduced to atmospheric pressure or less. This additional embodiment often allows for the more complete polymerization of the amides thereby achieving a higher molecular weight polyamide product.

In yet another embodiment of the invention, the dinitrile is adiponitrile and the diamine is hexamethylenediamine. The final polyamide produced when adiponitrile and diamine are used in the process of the present invention is poly(hexamethylene adipamide)(Nylon 6,6).

The polyamide can be produced in a continuous process and without the need for high levels of cocatalysts used in the prior art processes. Moreover, the polyamide has been found to exhibit low levels of triamine impurities.

The invention also relates to polyamides produced using these processes.

Further objects, features, and advantages of the invention will become apparent from the detailed description that follows.

DETAILED DESCRIPTION OF A PREFERRED EMBODIMENT OF THE INVENTION

The present invention is directed to a process for producing a polyamide from dinitriles and diamines. The process includes the step of contacting a dinitrile with a diamine, water, and optionally a catalyst to form a reaction mixture; heating the reaction mixture to a first elevated temperature of between about 180 to about 240° C., and maintaining the first elevated temperature for 0.10 to 20 hours; heating the reaction mixture to a second elevated temperature of between about 250 to about 350° C., wherein before or after the second elevated temperature is reached, water is added to the reaction mixture, some of the water is then subsequently removed, and the second elevated temperature is maintained for a period of about 0.10 to about 10 hours, preferably 0.10 to 4 hours; and recovering the polyamide. Optionally, the reaction mixture may be maintained at a third temperature of about 250 to about 350° C., that may be the same or different from the second elevated temperature, prior to recovering the polyamide, wherein at the third temperature, the reaction pressure is reduced to atmospheric pressure or less.

The reactions involved in the process include the hydrolysis of the dinitrile, which gives rise to a hydrolysis product including a carboxylic acid or unsubstituted amide intermediate. The hydrolysis product then reacts with the diamine to give rise to an amide link. Further polymerization produces the final desired product. The process of the present invention capitalizes on the conditions involving these reactions such that the polyamide produced has a low triamine content and can be produced without substantial amounts of cocatalyst.

The first step of the process is contacting a dinitrile with a diamine, water, and optionally a catalyst to form a reaction mixture.

In the present invention, dinitrile is meant to include any material which incorporates a dinitrile functionality. Preferably, the dinitrile will contain 2 through 20 carbons. The dinitrile may be aliphatic, straight chain or branched, or aromatic. The dinitrile may contain functionalities that do not interfere with polyamidation, such as alkyl, aryl, tertiary amines, and sulfates. Specific examples of dinitriles which are useful within the present invention include adiponitrile, suberonitrile, sebaconitrile, isophthalonitrile, 1,1 2-dodecane dinitrile, terephtalonitrile, and mixtures thereof. Preferably, the dinitrile is adiponitrile. In the process, the dinitrile is hydrolyzed to form a carboxylic acid. Preferably, in the case of adiponitrile, the carboxylic acid form from hydrolysis is adipic acid.

In the present invention, any diamine suitable for preparing a polyamide may be used. Diamines include any material which incorporates two amine functions. Preferably, the diamine will contain 2 to 20 carbons. The diamine may be aliphatic, straight chain or branched, or aromatic. The diamine may contain other functionalities that do not interfere with polyamidation, such as alkyl, aryl, tertiary amines, and sulfates. Specific examples of diamines which are useful in the present invention include hexamethylenediamine, tetramethylenediamine, 1,12-dodecane diamine, p-xylene diamine, 2-methyl-1,5-pentanediamine, 1,8-octanediamine, and 1,10-decanediamine. Preferably, the diamine is hexamethylenediamine. The diamine reacts with the hydrolyzed dinitrile product to form the amide. Therefore, the diamine should be added in an amount sufficient to react with the hydrolyzed dinitrile product and produce the desired amide. This amount is generally at a level of within 10 mole percent of equimolar based on the dinitrile. The exact level will be determined by factors including the molecular weight desired, the reactor design, losses of the dinitrile during the process, and losses of the diamine during the process.

Water is used in the present invention both as a reactant in the hydrolysis of the nitrile and as a processing aid in the polymerization. In the contacting step, the amount of water used should be the amount effective for hydrolysis of the dinitrile. Typically, this amount of water is at least equal in stoichiometry to the amount of nitrile to be hydrolyzed. The water is added into the reaction initially or during the reaction as a water purge.

The optional catalyst component of the present invention may include any substance, which promotes or accelerates the processes of the present invention. This may include catalysts identified within the background art for the hydrolysis of dinitriles, the polymerization of polyamides, the reaction of amines with nitrites, and the like. In addition, more than one catalyst component may be added to promote or enhance these reaction processes. Representative classes of catalysts include oxygen-containing phosphorus compounds, oxygen-containing boron compounds, oxygen-containing sulfur compounds, metal-containing compounds, such as copper or manganese, aliphatic and aromatic carboxylic acids, and Lewis acids. Specific examples of catalysts include phosphoric acid, phosphorous acid, hypophosphorous acid, pyrophosphoric acid, sodium hypophosphite hydrate, manganese(II)hypophosphite monohydrate, calcium hypophosphite, sulfuric acid, sulfamic acid, sodium bisulfate, ammonium hydrogen sulfate, phosphotungstic acid hydrate, phosphomolybdic acid hydrate, zinc acetate dihydrate, zinc sulfate heptahydrate, copper(II)acetate monohydrate, calcium acetate, glycolic acid, adipic acid, isophthalic acid, terephthalic acid, 5-sulfoisophthalic acid, lanthanum trifluoromethanesulfonate, manganese(II)acetate tetrahydrate, cetyltrimethylammonium bromide, 12-molybdosilicic acid hydrate, 2-pyridylphosphonic acid, 5-sulfoisophthalic acid, and mixtures thereof.

If a catalyst is used in the process, an effective amount of the catalyst will be that amount used to promote or enhance the hydrolysis of the dinitrile, polymerization of the amide, and/or the reaction of the dinitrile and diamine. This effective amount will differ for different catalysts, but typically falls within the range of 0.10 to 500 mmole, preferably 1.0 to 200 mmole, more preferably 2.0 to 10 mmole, of catalyst based on one mole of dinitrile.

While the inventors have found that no cocatalysts are required in the present invention, to effectuate the production of the polyamide, cocatalysts may be used in the present invention. Such cocatalysts may include any of the catalysts listed above.

Other components may be added to the reaction mixture as are known in the art. For example, stabilizers, including thermal stabilizers, polymerization catalysts, processing aids, pigments, antioxidants, and the like may be added.

The effective amounts of dinitrile, diamine, water, and optional catalyst to effectuate the reactions necessary for production of a polyamide are mixed together and added to a reactor, or added separately to the reactor and blended. Any desired reactor can be used and are known in the art. Suitable reactors include a stirred autoclave, an unstirred autoclave, a column reactor, a tube reactor, and a loop reactor.

Moreover, the process is generally run in the absence of air. The air may be removed by any known process. Examples include purging the reactor or reactors with inert gases, such as nitrogen or argon, evacuating the reactor and filling it within inert gases, and pressurizing the reactor with inert gases followed by venting to 1 atmosphere. These processes of removing the air may be repeated as many times as desired.

After the contacting step, the reaction mixture of the dinitrile, diamine, water, and optional catalyst are heated in the reactor to a first elevated temperature within the range of about 180 to 240° C., preferably 190 to 230° C., and more preferably 200 to 220° C. The temperature range of the process is determined by the rate of the reaction. At temperatures below 180° C., the rate of the reaction is generally too low to be economically useful. At temperatures above 240° C., significant amounts of by-products, such as triamine, may be formed. The reaction temperature may remain constant throughout the course of this reaction or may be varied.

In general, any pressure may be used in this step. However, the inventors have found that the process may be run at lower pressures than the prior art attributing to the less production of triamine by-products. For example, the reaction pressure for this step may be within the range of 100 to 500 psig, preferably 125 to 400 psig, more preferably 150 to 260 psig. This step may be run under autogenous pressure or may be vented. The reaction pressure may be controlled by the vent setting. In particular, the vent pressure may be set to let some of the water out. Preferably, the vent pressure is set to ensure that a majority of the water is not vented.

The time for the step of heating and maintaining the reaction mixture at this first elevated temperature is a function of the reaction temperature, process design, reaction catalyst type and level, and the like. Generally, once the reaction mixture is brought to the desired first elevated temperature, this temperature is maintained within the range of 0.10 to 20 hours, preferably 0.10 to 15 hours, more preferably 0.10 to 10 hours.

After heating to the first elevated temperature and maintaining the temperature for 0.10 to 20 hours, there is no need to cool the reaction mixture prior to heating to the second elevated temperature. Instead, the process is continuous from the first to second heating. Thus, after maintaining the first elevated temperature for a period of time, the reaction mixture is then heated to a second elevated temperature range of 250 to 350° C., preferably 260 to 325° C., more preferably 270 to 300° C., while purging the reaction by pumping water into the reactor and removing some portion of the added water through venting.

The temperature range of this step is determined by the rate of the hydrolysis reaction, the polymerization reaction and the like. At temperatures below 250° C., the reaction rate is generally too low to be economically useful. At temperatures above 350° C., significant amounts of by-products may be formed. The process temperature may remain constant throughout the course of the reaction or may be varied.

Before or after the second elevated temperature of 250 to 350° C. is reached, water is added to the reactor as a purge. The rate of water addition into the reaction may vary significantly based on the reaction scale, the reactor size, the reactor design, the reaction temperature and the like. In general, the rate of water addition should be an effective amount to aid in the removal of ammonia, which promotes the polymerization of the amide. Typically, this amount of water will be within the range of 0.01 to 100 moles of water per hour based on 1 mole of the nitrile. The rate of water addition will preferably be within the range of 0.1 to 75 moles, more preferably 0.1 to 10 moles of water per hour based on 1 mole of nitrile. Moreover, the purge rate may be constant throughout the process, the rate may be varied, or the purge may be turned off and on. The water purge may be turned on at any stage of the hydrolysis process.

Some of the water added to the mixture may then be removed by known methods, such as venting. While all of the water need not be removed, at least some of the water added in this step should be removed in order to effectively remove ammonia.

This step may be performed at any reaction pressure above atmospheric pressure. For example, the reaction pressure may be within the range of about 25 to 500 psig. Preferably, the reaction pressure is within the range of about 100 to 350 psig, more preferably 140 to 260 psig. The reaction pressure may be controlled by the vent setting.

The time for the step of heating and maintaining the reaction mixture at this second elevated temperature is a function of the reaction temperature, process design, and reaction catalyst type and level. Generally, once the reaction mixture is brought to the desired second elevated temperature, this temperature is maintained for a time within the range of 0.10 to 10 hours, preferably 0.10 to 8 hours, more preferably 0.10 to 4 hours.

The reaction mixture may stay in the same reactor as the reactor subjected to the first elevated temperature, or may be different for heating to the second elevated temperature. For example, the reactor for the first elevated temperature may feed the reaction mixture into a second reactor. This may be done by having a tube reactor that feeds the reaction mixture into an autoclave or column reactor, which is heated to the second elevated temperature. The reactor may be those known in the art including, but not limited to a stirred autoclave, an unstirred autoclave, a column reactor, a tube reactor, or a loop reactor.

The process of the present invention may optionally include an additional stage after the second elevated temperature heating stage and prior to recovery of the polyamide. The third optional step involves maintaining the reaction mixture at a temperature in the range of 250 to 350° C. while reducing the reaction pressure to atmospheric pressure. This allows further polymerization of the amide and may be useful in obtaining a polyamide having the molecular weight desired, and particularly, a higher molecular weight polyamide. The third stage is often referred to as finishing.

The third temperature range of the process is determined by the rate of the polymerization and the melting point of the product polymer. In particular, the polymer should be molten and the temperature must be high enough to get a reasonable rate of reaction. However, the temperature must not be too high so as to significantly degrade the polymer. The third temperature will generally be in the range of about 250 to 350° C., preferably 260 to 325° C., more preferably 270 to 300° C. This temperature may be the same as or different from the second elevated temperature provided it is within the range of about 250 to about 350° C.

While the third temperature is being maintained, the final pressure should be reduced to atmospheric or less. The rate at which the pressure is reduced to atmospheric pressure or less is not critical, but preferably, is conducted as fast as economically practical.

The length of time for this step is a sufficient time to form the desired molecular weight polymer. This time will be a function of the specific reactants, the product desired, the reaction temperature, the reaction pressure, and the like. Generally, this step will require from 0.1 to 5 hours, preferably 0.25 to 3 hours.

The reactor for this third heating step may be the same reactor design used for the process stages described above or may be different and is selected from known suitable reactors.

Notably, the process of the present invention is conducted in a continuous manner. For example, there is no need to discontinue the process to cool the reaction prior to moving to the next step of heating. Moreover, there is no need to discontinue the process to add additional reactants in different stages. Accordingly, the process simplifies the manner of producing polyamides by not having to interrupt the continuing reaction to produce the polyamide.

The inventors have found that the products produced according to this invention have less triamine contamination than prior art products. The triamine content may be measured, for example, by gas chromatography of the polyamide hydrolysate. For example, when the diamine, hexamethylenediamine, is used in the present process, the levels of the triamine, bishexamethylenetriamine (BHMT), may be determined. The greater the triamine content, the more contamination. In one embodiment of the invention, the polyamides produced according to the present invention have low levels of triamine content, such as about 1,000 ppm or less. In another embodiment of the invention, the polyamides have a triamine content of 900 ppm or less, preferably 500 ppm or less, more preferably 400 ppm or less, and most preferably, 200 ppm or less.

The products produced according to the present invention further may be characterized according to its relative viscosity. Relative viscosity refers to the ratio of solution and solvent viscosities measured in a capillary viscometer at 25° C. The solvent is formic acid containing 10% by weight of water. The solution is 8.4% by weight polyamide polymer dissolved in the solvent. This test is based on ASTM Standard Test Method D 789. The relative viscosities of the polyamides of the present invention are generally within the range of 10 to 100, preferably 15 to 65.

The products may be analyzed according to their polyamide end groups. In particular, the amine and acid end groups are determined in moles per million grams of polymers by known methods, such as by titration. For example, the polymers produced according to the examples were analyzed according to the methods on pages 293–294 in Volume 17 of the Encyclopedia of Industrial Analysis published by John Wiley & Sons, Inc. in 1973, herein incorporated by reference. In general, the polymer has amine end groups in the range of less than 150 moles per million grams polymer, preferably less than 110 moles per million grams polymer. Moreover, the polymer has acid end groups in the range of less than 400 moles acid per million grams polymer, preferably less than 250 moles acid per million grams polymer.

The polyamides of the present invention can be used in any known application for polyamides. For example, these polyamides can be used as fibers, plastics, films, and molding compounds.

EXAMPLES

This invention will now be illustrated by the following non-limiting specific examples. In each of the examples, the products are analyzed according to the following methods: adiponitrile hydrolysis levels and products were determined by high pressure liquid chromatography (HPLC) analysis; relative viscosity (RV) of the polymer samples was determined as a 8.4 weight percent polymer solution in 90.0% formic acid; polyamide end group analysis was determined by titration; and bishexamethylenetriamine (BHMT) levels were determined by gas chromatography (GC) analysis of the polyamide hydrolysate.

Example 1

This example demonstrates the production of polyamides by heating a mixture of the dinitrile, diamine, water, and catalyst to a first temperature of 180–240° C., and heating to a second temperature of 250–350° C. with water purging of the reactor at the second temperature, and maintaining the temperature of between 250–350° C. while the pressure is reduced to atmospheric pressure.

40.00 grams of adiponitrile, 33.26 grams of water, and 63.12 grams of 69.76 weight percent aqueous solution hexamethylenediamine (44.03 gram equivalent of hexamethylendiamine) were mixed with the catalyst, phosphoric acid, in an amount of 0.100 grams of a 85 weight percent aqueous solution of phosphoric acid (0.084 gram equivalent of phosphoric acid) in a 300 cc stainless steel autoclave at room temperature. The autoclave was pressurized to 300 psig with nitrogen and the pressure was then released. This operation was repeated for a total of three times.

With stirring, the autoclave was heated to 200° C. with the pressure vent set at 250 psig. After achieving 200° C., the pressure was found to vary between 166–248 psig.

After 3 hours at 200° C., the temperature was raised to 275° C. at which time, a water purge was pumped into the autoclave at a rate of 0.5 mL per minute. Through venting, the reaction pressure was maintained between 246–250 psig during the course of the experiment.

After 1 hour at 275° C., the autoclave was vented down to atmospheric pressure over 1 hour. After achieving atmospheric pressure, the autoclave was maintained at 275° C. for an additional 45 minutes. The autoclave was then allowed to cool to room temperature.

The contents of the autoclave were analyzed for relative viscosity, end groups, and BHMT content as described in Table 1.

Comparative Example 1

This comparative example demonstrates the results obtained where, when the second high temperature is reached, no water purging is added to the autoclave. The procedure of Example 1 was repeated except for the following changes. The same amounts of adiponitrile, water, hexamethylenediamine, and phosphoric acid were added to the 300 cc stainless steel autoclave at room temperature. The temperature was raised to same levels as in Example 1, but no purging of the reactor with water was conducted. After the first temperature of 200° C. was reached, the observed pressure ranged from 159–252 psig. After the second temperature of 275° C. was reached without any purging, the pressure was found to vary between 584–675 psig.

After 1 hour at 275° C., the autoclave was vented down to atmospheric pressure over 1 hour while maintaining the temperature of 275° C. After achieving atmospheric pressure, the autoclave was maintained at 275° C. for an additional 45 minutes. The autoclave was then allowed to cool to room temperature.

The contents of the autoclave were analyzed for relative viscosity, end groups, and BHMT content as described in Table 1. In particular, the product produced according to the method of this example showed a product having a high triamine content of 5,590 ppm. This high triamine content indicates a significantly contaminated and impure product.

Comparative Example 2

This comparative example also illustrates the results obtained where no purging is conducted. The procedure of Example 1 was followed using the same types and amounts of diamine, water, dinitrile, and phosphoric acid. However, with stirring, the autoclave was heated to 240° C. The autogenous pressure observed at 240° C. was within the range of 304–455 psig. After 70 minutes at 240° C., the autoclave was heated to 260° C. The autogenous pressure observed at 260° C. ranged from 526–592 psig. After 80 minutes at 260° C., the pressure was vented down to atmospheric pressure over 30 minutes. Once atmospheric pressure was attained, the reaction mixture was maintained at 260° C. for 15 minutes. The autoclave was allowed to cool to room temperature and the contents were analyzed.

The analysis of the products in this comparative example are shown in Table 1. Table 1 shows that the method of comparative example 2 produced a product with 222.3–232.8 moles of amine end groups per million grams of polymer. This high amount of amine groups is indicative of poor adiponitrile hydrolysis. As such, there is a poor hydrolysis of the adiponitrile. This is further evidenced by the analysis showing that there was no production of acid end groups. Finally, the resulting product had high levels of impurities as shown by a BHMT level of 1,684 ppm.

Comparative Example 3

This comparative example shows the results obtained when the temperature of the autoclaved mixture is raised only once to a high temperature. The procedure of Example 1 was followed except that phosphorous acid in an amount of 0.0836 grams was used as the catalyst. The autoclave containing the mixture was pressurized to 300 psig with nitrogen and the pressure was released. This procedure was conducted three times and, with stirring, the autoclave was heated to 275° C. with the pressure vent set at 250 psig. After achieving 275° C., a water purge was pumped into the autoclave at a rate of 0.5 mL per minute. Through venting, the reaction pressure was maintained between 240–253 psig during the course of the experiment. After 1 hour at 275° C., the water purge was discontinued and the autoclave was vented down to atmospheric pressure over 1 hour. At atmospheric pressure, the autoclave was allowed to cool to room temperature and the contents were analyzed.

The analysis of the products in this example are shown in Table 1. Table 1 shows that the method of comparative example 3 produced a product with a high amount of triamine content, since the BHMT content was 1,039 ppm.

Comparative Example 4

This comparative example illustrates the results obtained where no purging is conducted. The procedure of Example I was followed except that 0.0836 grams of, phosphorous acid was used as the catalyst. Moreover, the procedure differed from Example 1 in that the pressure at 200° C. was between 132–147 psig. After three hours at 200° C., the temperature was raised to 275° C. The reaction was allowed to stir at 275° C. for one hour with the pressure vent set at 250 psig. No purging with water was conducted. The autoclave was vented down to atmospheric pressure over one hour. The autoclave was further maintained at 275 ° C. for an additional 45 minutes and then cooled to room temperature.

The analysis of the products in this example are shown in Table 1. Table 1 shows that the method of comparative example 4 produced a product with a high amount of amine end groups signifying poor adiponitrile hydrolysis. It further shows an acid end group content of 22.2 moles per million grams polymer, which is indicative of poor production of the desired polyamide. Moreover, the BHMT content of 2,709 ppm is indicative of a high amount of triamine content.

Example 2

The procedure of Example 1 was followed except as follows: 62.24 grams of a 69.76 weight percent aqueous solution of hexamethylenediamine (43.42 gram equivalent of hexamethylenediamine) was used and the catalyst, phosphorous acid, was used in an amount of 0.0836 grams. At the temperature of 200° C., the pressure was found to vary between 163–250 psig. At this second temperature of 275° C., the reaction pressure was maintained through venting between 245–258 psig during the course of the experiment. The contents of the autoclave were analyzed as described in Table 1.

Example 3

The procedure of Example 1 was followed except as follows: 62.54 grams of a 69.76 weight percent aqueous solution of hexamethylenediamine (43.63 gram equivalent of hexamethylenediamine) was used and the catalyst, phosphorous acid, was used in an amount of 0.0836 grams. At the temperature of 200° C., the pressure was found to vary between 170–229 psig. At the second temperature of 275° C., the reaction pressure was between 140–253 psig. The contents of the autoclave were analyzed as described in Table 1.

Example 4

The procedure of Example 1 was followed except as follows: the catalyst, phosphorous acid, was used in an amount of 0.0836 grams. At the temperature of 200° C., the pressure was found to vary between 170–229 psig. At the second temperature of 275° C., the reaction pressure was between 140–253 psig. The contents of the autoclave were analyzed as described in Table 1.

Example 5

This example demonstrates the usefulness of catalyst mixtures. The procedure of Example 1 was followed except as follows: a catalyst mixture of 0.0205 grams of phosphorous acid and 0.0075 grams of calcium hypophosphite was used. At the temperature of 200° C., the pressure was found to vary between 163–251 psig. At the second temperature of 275° C., the reaction pressure was between 241–249 psig. The contents of the autoclave were analyzed as described in Table 1.

Example 6

The procedure of Example 1 was followed except as follows: a catalyst mixture of 0.0205 grams of phosphorous acid and 0.0075 grams of calcium hypophosphite was used. At the temperature of 200° C., the pressure was found to vary between 163–251 psig. At the second temperature of 275° C., the reaction pressure was between 241–249 psig.

After 2 hours at 275° C., instead of the 1 hour as set forth in Example 1, the water purge was discontinued; the autoclave was vented down to atmospheric pressure over 1 hours; and the autoclave was maintained at 275° C. for an additional 45 minutes. The contents of the autoclave were analyzed as described in Table 1.

Example 7

This example demonstrates the production of polyamides by heating a mixture of the dinitrile, diamine, water, and catalyst to a first temperature of 180–240° C., and then a second temperature of 250–350° C. with water purging of the reactor at the second temperature at two different rates.

40.00 grams of adiponitrile, 33.26 grams of water, 62.24 grams of 69.76 weight percent aqueous solution hexamethylenediamine (43.42 gram equivalent of hexamethylenediamine), and 0.0836 grams of phosphorous acid were added to a 300 cc stainless steel autoclave at room temperature. The autoclave was pressurized to 300 psig with nitrogen and the pressure was then released. This operation was repeated for a total of three times.

With stirring, the autoclave was heated to 200° C. with the pressure vent set at 250 psig. After achieving 200° C., the pressure was found to vary between 168–223 psig.

After 3 hours at 200° C., the temperature was raised to 275° C. After achieving 275° C., a water purge was pumped into the autoclave at a rate of 5.0 mL per minute. Through venting, the reaction pressure was maintained between 248–252 psig during the course of the experiment.

After 20 minutes at 275° C., the water purge rate was reduced to 0.5 mL per minute. After 40 minutes at 275° C., the water purge was discontinued. While maintaining a reaction temperature of 275° C., the autoclave was vented down to atmospheric pressure over 1 hour. After achieving atmospheric pressure, the autoclave was maintained at 275° C. for an additional 45 minutes. The autoclave was then allowed to cool to room temperature.

Example 8

This example demonstrates the production of polyamide by heating a mixture of the dinitrile, diamine, water, and catalyst at various temperatures within 180–240° C. for the first temperature and within 250–350° C. for the second temperature with purging.

40.00 grams of adiponitrile, 33.26 grams of water, 62.24 grams of a 69.76 weight percent aqueous solution of hexamethylenediamine (43.42 gram equivalent of hexamethylenediamine), and 0.0836 grams of the catalyst, phosphorous acid, were mixed in a 300 cc stainless steel autoclave at room temperature. The autoclave was pressurized to 300 psig with nitrogen and the pressure was then released. This operation was repeated for a total of three times. With stirring, the autoclave was heated to 220° C. with the pressure vent set at 250 psig. After achieving 220° C., the pressure varied at a range of 230–251 psig. After three hours at 220° C., the temperature was raised to 275° C. At this second temperature, a water purge was pumped into the autoclave at a rate of 0.5 mL per minute. Through venting, the reaction pressure was maintained between 248–252 psig during the course of the experiment. After 1 hour at 275° C., the water purge was discontinued and the autoclave was vented down to an atmospheric pressure over 1 hour. After achieving atmospheric pressure, the autoclave was maintained at 275° C. for an additional 45 minutes then allowed to cool to room temperature.

The contents of the autoclave were analyzed and the results are described in Table 1.

TABLE 1

| Example | Relative Viscosity | End group Analysis for Amine (moles/million grams polymer) | End group Analysis for Acid (moles/million grams polymer) | BHMT (ppm) |
| --- | --- | --- | --- | --- |
| 1 | 65 | 93 | 14.5 | 860 |
| 2 | 20 | 18 | 139.0 | 148 |
| 3 | 24 | 19 | 123.6 | 415 |
| 4 | 50 | 30 | 63.5 | 499 |
| 5 | 16 | 21 | 69.0 | 413 |
| 6 | 46 | 106 | 10.2 | 1,010 |
| 7 | 15 | 18 | 235.2 | 318 |
| 8 | 15 | 17 | 207.7 | 133 |
| Comp. Ex. 1 | 19 | N.M. | N.M. | 5,590 |
| Comp. Ex. 2 | 16 | 233 | 0.0 | 1,684 |
| Comp. Ex. 3 | 5 | N.M. | N.M. | 1,039 |
| Comp. Ex. 4 | 12 | 181 | 22.2 | 2,709 |

"N.M." means not measured.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A process for producing a polyamide comprising
    (a) contacting a dinitrile, a diamine, water, and optionally a catalyst to form a reaction mixture;
    (b) heating the reaction mixture to a first elevated temperature of between about 180 to about 240° C.; maintaining said temperature for about 0.10 to about 20 hours; and optionally controlling the pressure by venting of water;
    (c) heating the reaction mixture at the first elevated temperature to a second elevated temperature of between about 250 to about 350° C.; adding water to the reaction mixture before or after the second elevated temperature is reached; maintaining the pressure in step (c) above atmospheric pressure by venting at least some of the water; and maintaining the second elevated temperature for a period of about 0.10 to about 10 hours to produce a polyamide.

2. The process according to claim 1, wherein in step (a), the diamine is added in an amount within 10 mole percent of equimolar based on the dinitrile and further wherein in step (a), the water is added in at least a stoichiometric amount relative to dinitrile.

3. The process according to claim 1, wherein after step (c), the reaction mixture is maintained at a third temperature of about 250 to about 350° C. while the reaction pressure is reduced to atmospheric pressure or less.

4. The process according to claim 1, wherein the first elevated temperature is between about 200 to about 220° C. and the second elevated temperature is between about 270 to about 300° C.

5. The process of claim 1, wherein the diamine is selected from the group consisting of hexamethylenediamine, tetramethylenediamine, 1,12-dodecane diamine, p-xylene diamine, 1,8-octanediamine, and 1,10-decanediamine, and the dinitrile is selected from the group consisting of adiponitrile, suberonitrile, sebaconitrile, 1,12-dodecane dinitrile, 2-methyl-1,5-pentanediamine, terephthalonitrile, and mixtures thereof.

6. The process of claim 5, wherein the diamine is hexamethylenediamine and the dinitrile is adiponitrile.

7. The process of claim 1, wherein in step (a), a catalyst is used.

8. The process of claim 7, wherein the catalyst is selected from the group consisting of phosphoric acid, phosphorous acid, hypophosphorous acid, pyrophosphoric acid, sodium hypophosphite hydrate, manganese(II)hypophosphite monohydrate, calcium hypophosphite, sulfuric acid, sulfamic acid, sodium bisulfate, ammonium hydrogen sulfate, phosphotungstic acid hydrate, phosphomolybdic acid hydrate, zinc acetate dihydrate, zinc sulfate heptahydrate, copper(II)acetate monohydrate, calcium acetate, glycolic acid, adipic acid, isophthalic acid, terephthalic acid, 5-sulfoisophthalic acid, lanthanum trifluoromethanesuylfonate, manganese(II)acetate tetrahydrate, cetyltrimethylammonium bromide, 12-molybdosilicic acid hydrate, 2-pyridylethylphosphonic acid, 5-sulfoisophthalic acid, and mixtures thereof.

9. The process of claim 8, wherein the catalyst is phosphoric acid or phosphorous acid.

10. The process of claim 1, wherein in step (b), the pressure is 100 to 500 psig and in step (c), the pressure is 25 to 500 psig.

11. The process of claim 10, wherein in step (b), the pressure is 150 to 260 psig and in step (c), the pressure is 140 to 260 psig.

12. The process of claim 9, wherein the first elevated temperature is between about 200 to about 220° C.; wherein the second elevated temperature is between about 270 to about 300° C.; wherein after step (c), the reaction mixture is maintained at a third temperature of about 250 to about 350° C. while the reaction pressure is reduced to atmospheric pressure; wherein the third temperature can either be the same or different from the second elevated temperature; and wherein said diamine is hexamethylenediamine and said dinitrile is adiponitrile.

13. A polyamide produced according to the process of claim 1.

14. A polyamide produced according to the process of claim 12.

15. A process for producing a polyamide comprising
 (a) contacting a dinitrile, diamine, water, and optionally a catalyst to form a reaction mixture;
 (b) heating the reaction mixture to a first elevated temperature of between about 200 to about 220° C., and maintaining said temperature for 0.10 to 10 hours;
 (c) heating the reaction mixture to a second elevated temperature of between about 270 to about 300° C.; adding water to the reaction mixture before or after the second elevated temperature is reached; subsequently removing some of the added water through venting; and maintaining the second elevated temperature for a period of about 0.10 to about 4 hours;
 (d) heating the reaction mixture to a third temperature of between about 275 to about 300° C. and maintaining the third temperature, which may be the same or different from the second elevated temperature, while the reaction pressure is reduced to atmospheric pressure or less to produce a polyamide.

16. A polyamide produced according to the process of claim 15.

* * * * *